United States Patent [19]

Yamanaka et al.

[11] 4,200,883
[45] Apr. 29, 1980

[54] SOLID STATE COLOR TELEVISION CAMERA

[75] Inventors: Seisuke Yamanaka, Mitaka; Fumio Nagumo, Yokohama; Toshimichi Nishimura, Tama, all of Japan

[73] Assignee: Sony Corporation, Tokyo, Japan

[21] Appl. No.: 831,155

[22] Filed: Sep. 7, 1977

[30] Foreign Application Priority Data

Sep. 16, 1976 [JP] Japan .................. 51-111106

[51] Int. Cl.$^2$ ............................................. H04N 9/07
[52] U.S. Cl. .................................................. 358/44
[58] Field of Search ................. 358/38, 41, 43, 44–48

[56] References Cited

U.S. PATENT DOCUMENTS

| 3,971,065 | 7/1976 | Bayer .................................... 358/44 |
| 4,059,839 | 11/1976 | Yamanaka et al. ...................... 358/44 |

Primary Examiner—John C. Martin
Assistant Examiner—Aristotelis M. Psitos
Attorney, Agent, or Firm—Hill, Van Santen, Steadman, Chiara & Simpson

[57] ABSTRACT

A solid state color television camera having a solid state image sensing device and an optical color filter. In this case, the color separating characteristics of the color filter is so selected that when a predetermined horizontal scanning line is scanned, from the solid state image sensing device there are obtained a red color signal and a luminance signal of the standard system sequentially and alternately, and from a horizontal scanning line adjacent the above horizontal scanning line there are obtained a blue color signal and luminance signal. Also, as the high band component, which constitutes the above luminance signal, the high band component of a composite video output signal, which includes the primary color signal and luminance signal produced by scanning the above horizontal scanning line, is utilized. Further, by scanning the respective horizontal scanning lines, different color difference output signals obtained at every one horizontal scanning line are made in simultaneity and based upon the color difference output signals and luminance signal there is produced a color video signal of the standard system.

5 Claims, 17 Drawing Figures

SOLID STATE COLOR TELEVISION CAMERA

BACKGROUND OF THE INVENTION

1. Field of the Invention

This invention relates generally to a solid state color television camera, and is directed more particularly to a solid state color television camera in which color difference signals obtained from a special color filter in a line sequential manner are converted to a simultaneous color signal.

2. Description of the Prior Art

In the art there have been proposed various solid state color television cameras which use a semiconductor element such as a bucket brigade device (BBD), charge coupled device (CCD) or the like as its solid state image sensing device. Similarly, various color filters which are disposed at the front of the solid state image sensing device have been well known. One of the well known color filters, for example, a so-called double-green type filter, which includes much amount of a green color component, especially appealing to a view's eyesight, than those of the other color components forming the luminance signal, is used to improve the resolution.

This double-green type color filter has a plurality of transparent or light transmissibility regions whose unit region corresponds to one picture element. In this case, the region corresponding to an odd horizontal scanning line is so selected that it contains the green color component G twice as compared with red and blue color components R and B, for example, the transparent regions of G, R and B are arranged in the horizontal scanning line in the order of G-R-G-B which is repeated sequentially in this order.

On an even horizontal scanning line, due to the signal process described later, the position of the transparent regions is so selected that the green color component G is reverse in phase to that on the odd horizontal scanning line.

Accordingly, when an object is picked up by a camera using the above filter, the spectra and phase relation of the respective color components become as follows.

If the sampling frequency in the horizontal scanning direction is selected as $f_C$ and the band of green color component G is selected as sampling frequency $f_C$(4.5 MH$_z$), the sampling output relating to the green signal in the output obtained from the solid state image sensing device includes, in addition to a modulating signal component (DC components or base band components) $S_{DG}$, a side band component (AC component) $S_{MG}$ whose carrier is sampling frequency $f_C$. If sampling frequency $f_C$ is about 4.5 MH$_z$ as set forth above, the relation of the signal bands becomes such that side band component $S_{MG}$ is mixed into modulating signal component $S_{DG}$ to cause a sampling error. This sampling error caused by side band component $S_{MG}$ deteriorates a reproduced picture, so that in general the sampling error is removed by utilizing the vertical correlation process or theory. That is, since the phases of carries obtained from adjacent horizontal scanning lines are opposite, the sampling error can be removed by the vertical correlation process.

The carriers of the respective red color component R and blue color component B are just one-half of that of green color component G, so that it is impossible that even if components R and B are obtained from the respective horizontal scanning lines, side band components $S_{MR}$ ($S_{MB}$) are removed by the vertical correlation process as in green component G, since the phases of their carriers are not opposite.

In order to remove bad affect of the side band components on a reproduced picture, it is difficult or almost impossible to limit the pass band of the wave length of only a desired color signal by an optical device, that is, to form a optical low pass filter of the type depending upon the wave length.

OBJECTS AND SUMMARY OF THE INVENTION

Accordingly, an object of the present invention is to provide a solid state color television camera free from the defect of the prior art.

Another object of the invention is to provide a solid state color television camera in which a flicker on a reproduced picture due to a sampling error caused by sampling the output of a solid state image sensing device is avoided.

A further object of the invention is to provide a solid state color television camera with which even when an object with no vertical correlation is picked up, especially a black-and-white image is picked up, it is reproduced with no color and hence any deterioration of a reproduced picture can be positively avoided.

According to the present invention, color difference signals (R-Y) and (B-Y) obtained from a solid state image sensing device are made in simultaneity and a desired color video signal is produced from the simultaneous color difference signals and a luminance signal. Thus, in the case that a black-and-white image is picked up, irregardless of whether there is no vertical correlation in a picked up signal at every line or not, any deterioration of a reproduced picture is avoided or a reproduced picture is prevented from being colored without using an optical low pass filter whose characteristic depends upon wavelength.

In the luminance signal system, the sampling error can not be removed entirely even by the vertical correlation process where there is no vertical correlation and hence the side band component remains in the prior art. Thus, if an object is a colored one, there is less affected by the remaining component on a reproduced picture, but if the object is a black-and-white one, the affect by the remaining component can not be neglected. Therefore, in such a case, it is better to cancel the side band component upon picking up a black-and-white image than to employ the vertical correlation process.

In view of the above, according to the present invention, without using the optical low pass filter having the dependency upon wavelength, the deterioration of a reproduced picture caused by the remaining side band component is removed and the deterioration of a reproduced picture upon picking up a black-and-white picture is avoided by always cancelling the side band components.

As the high band component of a luminance signal used in the invention, a luminance signal over the whole band produced by sampling and holding the output from a solid state image sensing device such as a CCD is not merely used, but a composite video signal of the luminance signal and the primary color signal R or B is used. The reason why the composite video signal is used as the high band component of the luminance signal is that the phases of carriers of the side band component contained in the composite video signal are reverse between the luminance signal and primary color signal. In this invention, the side band component is removed by utilizing the phase difference between the carriers without carrying out the vertical correlation process.

According to an aspect of the present invention there is provided a solid state color television camera which comprises a solid state image sensing device including a plurality of individual light sensing units arranged in both horizontal and vertical rows, said solid state color television camera comprising an optical device for establishing an image light path for projecting an image of an object on said image sensing device, a plurality of color filter elements arranged in horizontal rows within said light path, said color filter elements having transmissibilities selected to pass therethrough a first primary color information and a first luminance signal information succeedingly in a first horizontal line and to pass therethrough a second primary color information and a second luminance signal information succeedingly in a second horizontal line, a circuit for processing a first color signal having the first primary color information and first luminance information and for processing a second color signal having the second primary color information and second luminance information to produce a signal as a high luminance signal component of the luminance signal when a predetermined horizontal row is projected by the image light path, a circuit for processing a third luminance image signal from each of the filter elements to produce a signal as a low luminance signal component of the luminance signal when the predetermined horizontal row is projected by the image light path, and a circuit for mixing the high and low luminance components to produce an entire luminance signal component.

The other objects, features and advantages of the present invention will become apparent from the following description taken in conjunction with the accompanying drawings through which the like reference numerals designate the like elements.

DESCRIPTION OF THE PREFERRED EMBODIMENTS

The present invention will be hereinafter described in connection with the prior art with reference to the drawings.

Figures 1, 2A:
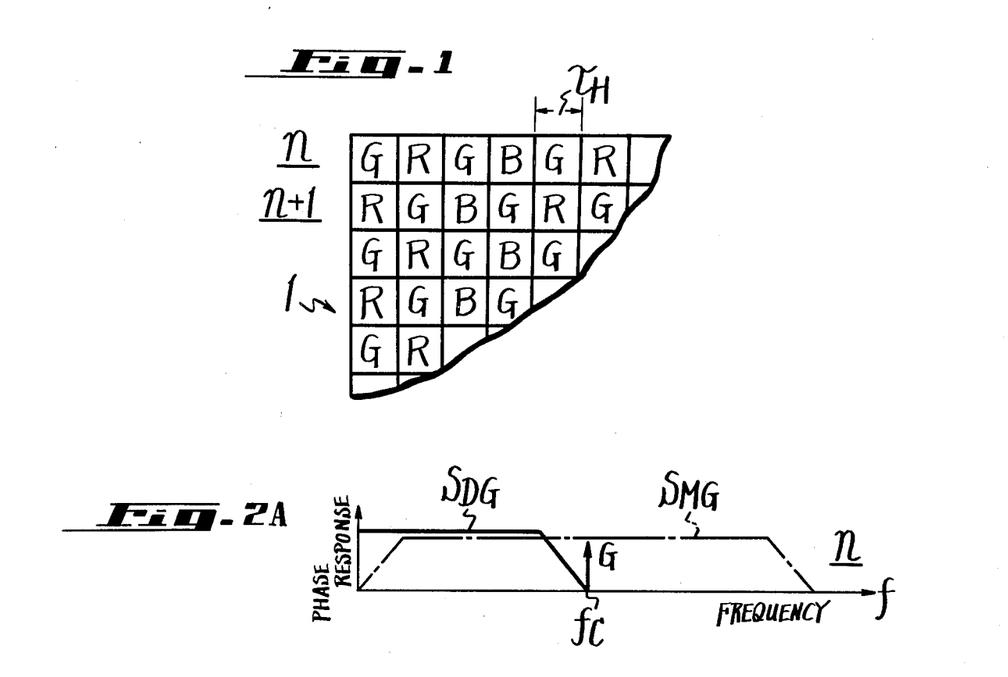
FIG. 1 is a partial front view of an optical color filter used for explaining the present invention.
FIGS. 2A to 2D are waveform diagrams used for explaining the color filter shown in FIG. 1.

In general, when an object is picked up by a color television camera using a double green type color filter 1 shown in FIG. 1, the spectra and phase relation of color signal components from the camera are shown in FIGS. 2A to 2D.

Figure 2B:
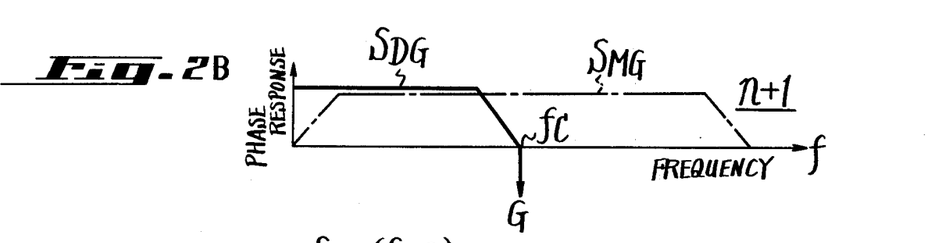

If it is assumed that the sampling frequency in the horizontal scanning direction is taken as $f_C$ and the band of a green color component G is selected as the sampling frequency $f_C$ (about 4.5 MH$_z$), the sampled output signal relating to the green color signal (for example, the color signal at n line) in the output signal from a solid state image sensing device includes, in addition to modulating signal component (DC components or base band components) $S_{DG}$, side band components (AC components) $S_{MG}$ whose carrier is sampling frequency $f_C$, as shown in FIG. 2A. If the sampling frequency $f_C$ is about 4.5 MH$_z$ as set forth above, the relation of the signal bands is shown in FIG. 2A or side band components $S_{MG}$ are mixed into modulating signal components $S_{DG}$. Thus, a sampling error is caused by the side band component $S_{MG}$ which sampling error will deteriorate a reproduced picture as set forth previously, so that in general the sampling error is removed by utilizing the vertical correlation theory or process. That is, the phase of the carrier obtained from an adjacent horizontal scanning line (for example, n+1 line in this case) is opposite to that from the n horizontal scanning line as may be apparent from FIG. 1, so that the output spectra shown in FIG. 2B is obtained from the n+1 scanning line. Thus, if a so-called vertical correlation process to mix succeeding two lines is carried out, the sampling error can be removed.

Figure 2C:
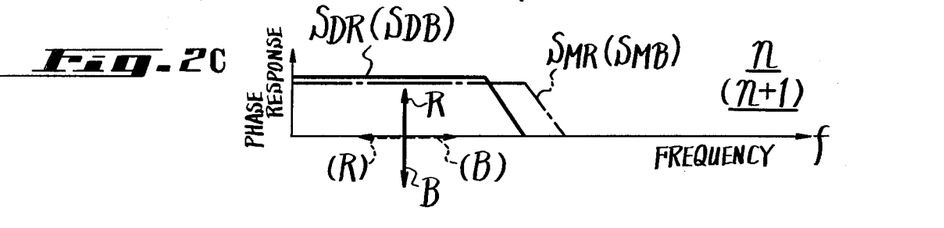

Since the respective carriers of red color component R and blue color component B are just one-half of that of the green color component G, the relation between the modulating signal components $S_{DR}$, $S_{DB}$ and side band components $S_{MR}$, $S_{MB}$ in the respective red and blue color components R and B is shown in FIG. 2C. That is, the carrier of the red component R in a predetermined horizontal line is in oppose phase relation to the carrier of the blue component B, and the carriers of red and blue components R and B in the succeeding line are also in oppose phase relation. In this case, although red and blue components R and B are obtained from each horizontal scanning line, the successive same color signal informations in the horizontal or line period are not in oppose phase relation (advanced by 90°) and hence it is impossible to remove side band components $S_{MR}$ ($S_{MB}$) by the same vertical correlation process as in the case of green component G. In FIG. 2C, the color components at n+1 line are designated by reference letters in parentheses.

Where, if the level of the DC components mixed in the low band side of the side band components is sufficiently low as compared with that of the modulating signal component, there may occur no serious problem. However, if the carriers of components R and B are low such as $\frac{1}{2} f_C$ as in the above example, the level ratio of the side band components mixed in the low band of the DC components is great, and accordingly an affect of the side band components on a reproduced picture can not be neglected.

Figure 2D:
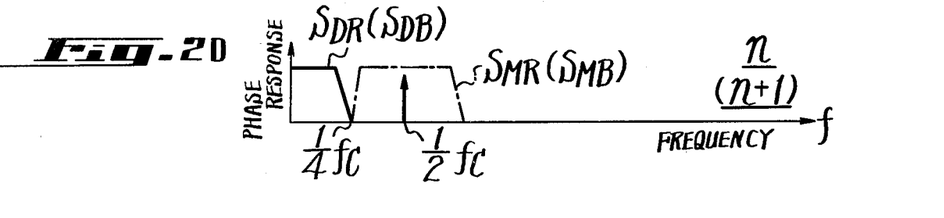

In order to remove the above affect on the reproduced picture, if the bands of the R and B components are lowered than $\frac{1}{4} f_C$ by optical means, the relation between the modulating and side band components becomes as shown in FIG. 2D or the side band component does not mix in the modulating component. However, it is not so easy to limit the pass band of only optically desired wave length or to provide an optical low pass filter of the wave length dependent type, as set forth previously.

Figure 3:
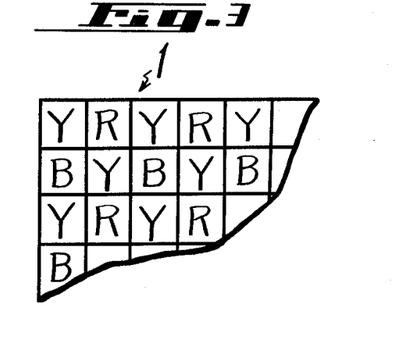
FIG. 3 is a partial front view of an optical color filter used in a prior art television camera and that of the invention.

In order to remove or eliminate the above sampling error without using the above optical low pass filter, it may be considered that the light separation characteristic of color filter 1 is selected as, for example, shown in FIG. 3 in which the light separating characteristic of color filter 1 is so selected that a light component Y, which will be a luminance signal in the standard system, is obtained from a desired transparent region. That is, in this color filter 1 its odd line is selected or formed of the transparent regions Y-R-Y-R . . . and its even line is formed of the transparent regions B-Y-B-Y . . . In this case, if the transparent regions of Y are selected oppose in phase at adjacent lines, the luminance component Y becomes opposite in phase at every line. Thus, a sampling error on the luminance component Y can be removed by the vertical correlation process as in the process of the green signal components in FIG. 1.

Since the carrier of components R and B have the same frequency as that of component Y and their pass bands are not restricted, the relation between the modulating components and side band components in components R and B becomes just same as that shown in FIG. 2A. On the side band components relating to components R and B, the vertical correlation can not be utilized similar to the example of FIG. 1, so that the side band components remain in the respective modulating components. However, the level (remaining level) of the side band component existing in the low band side of the modulating component under the remaining state shown in FIG. 2A is much lower than that of the prior art shown in FIG. 2C and hence an affect of the remaining side band component on a reproduced picture proposes no problem in practical use.

Figure 4:
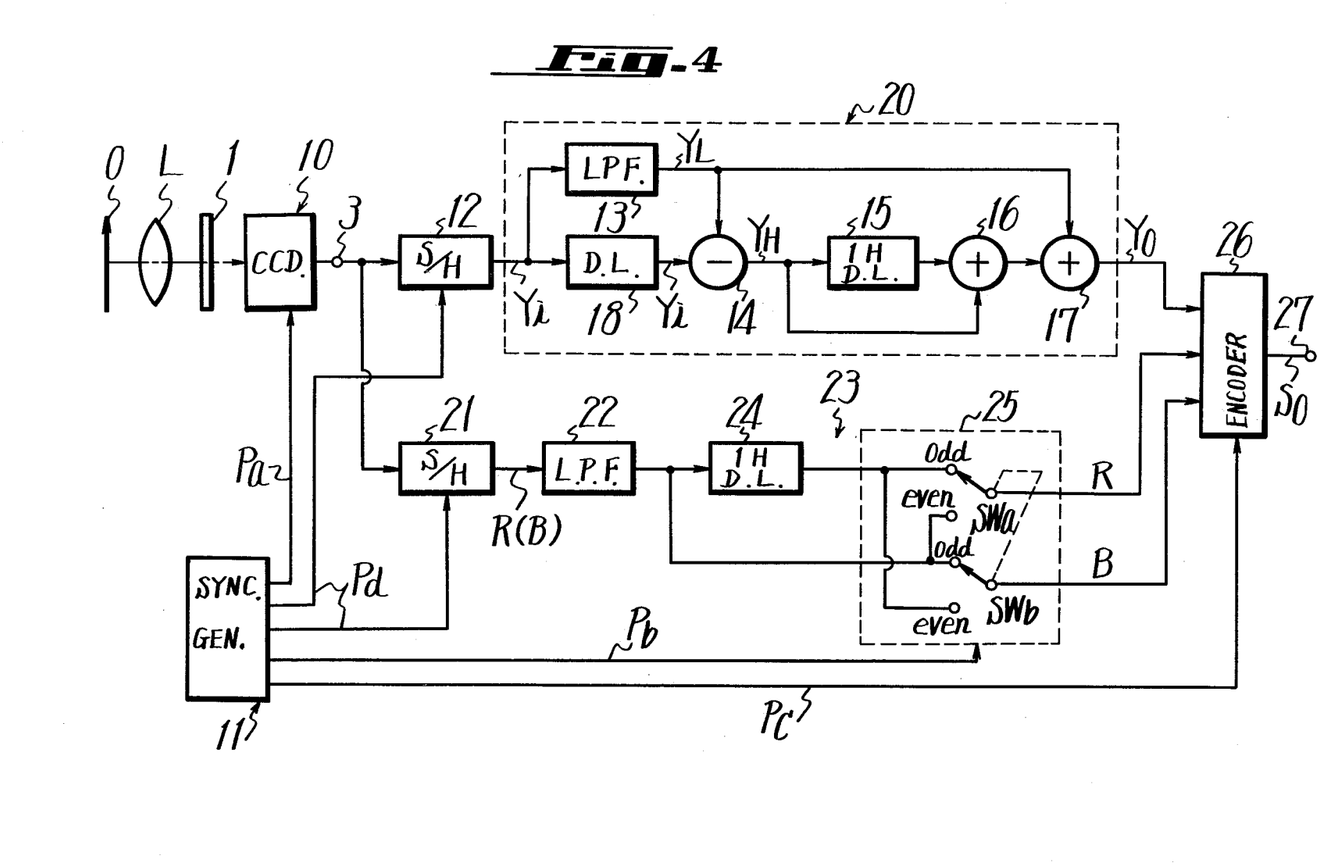
FIG. 4 is a systematic block diagram showing the circuit of a prior art solid state television camera.
Figure 5:
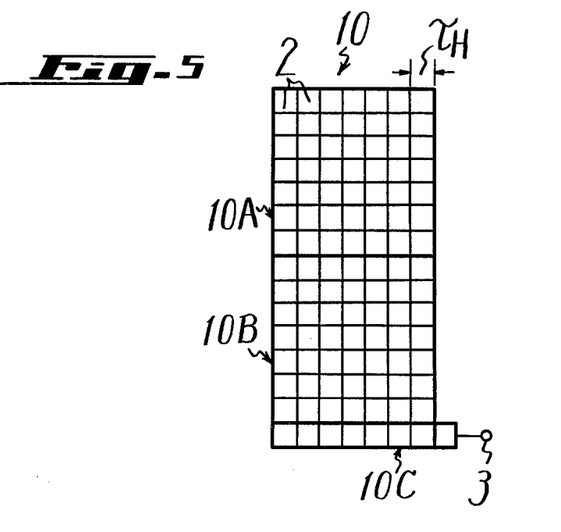
FIG. 5 is a front view showing a solid state image sensing device which is useable in the invention.

FIG. 4 shows the circuit of a television camera in which the color filter 1 shown in FIG. 3 is used and a CCD tip of the frame transfer system shown in, for example, FIG. 5 is used as a solid state image sensing device 10. This solid state image sensing device or CCD tip 10 consists, as well known, of an image sensing array 10A, which includes a plurality of image sensing cells, picture elements or light sensing units 2 arranged in row and column directions on which an image of an object O is projected through an optical lens system L and color filter 1, a temporary storage array 10B, which stores the carrier induced in response to object O, and a horizontal shift register 10C for reading out the stored carriers from which an output terminal 3 is led out.

Solid state image sensing device or CCD tip 10 is supplied with a driving pulse signal Pa from a synchronizing signal generator 11. This driving pulse Pa includes a plurality of pulses which are necessary to induce carriers in response to the image of object O, transfer the carriers and read out the carriers, respectively. The luminance signal Y in the picked up output signal obtained at terminal 3 is subjected to the vertical correlation process. To this end, the output signal from terminal 3 is fed to a sampling hold circuit 12 and a luminance signal $Y_i$ read out from sampling hold circuit 12 is supplied to a vertical correlation process circuit 20. In the circuit of FIG. 4, in order to avoid that the resolution in the vertical direction is deteriorated, the low band component of luminance signal $Y_i$ is not subjected to the vertical correlation process but only its high band component is subjected to the vertical correlation process. Accordingly, in the vertical correlation process circuit 20, luminance signal $Y_i$ is fed at first to a low pass filter 13 through which a low band component $Y_L$ (about 500 to 1000 KHz) in luminance signal $Y_i$ is derived. Since low band component $Y_L$ and luminance signal $Y_i$ are fed to a subtractor 14, this subtractor 14 produces only a high band component $Y_H$ of luminance signal $Y_i$. The high band component $Y_H$ is fed through a delay line or circuit 15 of 1H (H is the horizontal line period) to an adder 16 which is also supplied with component $Y_H$ which is not delayed.

Since the phase relation between the carriers of adjacent horizontal scanning lines is opposite, the side band components are cancelled by the above signal process. As a result, if the output signal from adder 16 and low band component $Y_L$ are supplied to a next stage of an adder 17, this adder 17 produces a luminance signal $Y_O$ over all band from which the side band components are removed. A delay line or circuit 18 provided at the input side of subtractor 14 serves to correct the inconsistency of transmission time caused by time delay caused of low pass filter 13.

While, since red component R and blue component B are obtained at every 2H, in order to obtain a desired color video signal $S_o$, it is necessary that these components R and B are obtained simultaneously and successively as the luminance signal Y. The circuit for this purpose will be described.

The output signal obtained at terminal 3 is also applied to a sampling hold circuit 21 which produces a red color signal R (or blue color signal B) and supplies the same through a low pass filter 22 to a simultaneous circuit 23 which is formed of a delay line or circuit 24 of 1H and a switching circuit 25. The switching circuit 25 is formed so as to always deliver red color signal R to its one output terminal and blue color signal B to its other output terminal. That is, if switching circuit 25 is shown mechanically, it is formed of two-circuit-two-contact type as shown in FIG. 4. In this case, delayed output signal from delay circuit 24 and non-delayed output signal from low pass filter 22 are supplied to switching circuit 25 at its desired terminals, respectively. A pair of switches $SW_a$ and $SW_b$ of switching circuit 25 are changed over by a control signal $P_b$ from signal generator 11 at every 1H. Thus, the primary color signal R and B (sampled output signals) which are obtained alternately at every 2H are made in simultaneity and then delivered to the output side of switching circuit 25 simultaneously. The simultaneous primary color signals R and B together with luminance signal $Y_O$ are fed to an encoder 26 which produces at its output terminal 27 color television signal $S_o$ of the standard system such as the NTSC system. In this case, encoder 26 and sampling hold circuits 12 and 21 are supplied with desired driving pulses $P_c$ and $P_d$ from generator 11.

In the case that the primary color signals R and B are provided simultaneously and the desired color video signal $S_o$ is produced as described above, the defects caused by the sampling error can be removed but the following problem newly occurs. Since the fact that the primary signals are made in simultaneity in time implies that the sampling output signals at adjacent horizontal lines are used simultaneously, if the output signals at N line (for example, odd line) and N+1 line are taken into consideration, color difference output signals $E_{CR(N)}$ and $E_{CR(N+1)}$ at the respective lines are expressed by the following equations, respectively.

$$E_{CR(N)} = a\{R_{(N)} - Y_{O(N)}\} + b\{B_{N-1} - Y_{O(N)}\} \quad (1)$$

$$E_{CR(N+1)} = a\{R_{(N)} - Y_{O(N+1)}\} + b\{B_{(N+1)} - Y_{O(N+1)}\} \quad (2)$$

where a and b are constants, respectively.

Accordingly, in the color difference signal in each line there is contained without failure the primary color signal before 1H, so that when an object having no vertical correlation is picked up, especially a black-and-white image is picked up, the color difference signals expressed by the above expressions (1) and (2) do not become zero. As a result, a picture with color is reproduced and hence the picture reproduction quality is deteriorated. In other words, in the color difference signal $E_{CR(N)}$ at N line the primary color signal $B_{(N-1)}$ before 1H is contained and in the color difference signal $E_{CR(N+1)}$ at N+1 line the primary color signal $R_{(N)}$ before 1H is also contained. Thus, when the contents of a picture are different at every line, the primary color signals $B_{(N-1)}$ and $R_{(N)}$ are not always in correct level.

An example of the solid state color television camera according to the present invention, which removes the deterioration of a reproduced picture caused by the remaining of the side band components without using the optical low pass filter and also completely eliminates any affect by the case that no vertical correlation exists, will be hereinafter described with reference to FIGS. 6 and 7 through which the parts same as those of FIGS. 2 and 4 are marked with the same reference numerals and letters.

On the case that the output signal from CCD tip 10 is separated to the luminance and chrominance signal systems will be described. At first, the chrominance signal system will now be described. With the present invention, the primary color signals are not processed simultaneously, but the color difference signals R-Y and B-Y are processed simultaneously. In this case, it is possible that color difference signals R-Y and B-Y are extracted from the side band components or modulating components, respectively.

Figure 6:
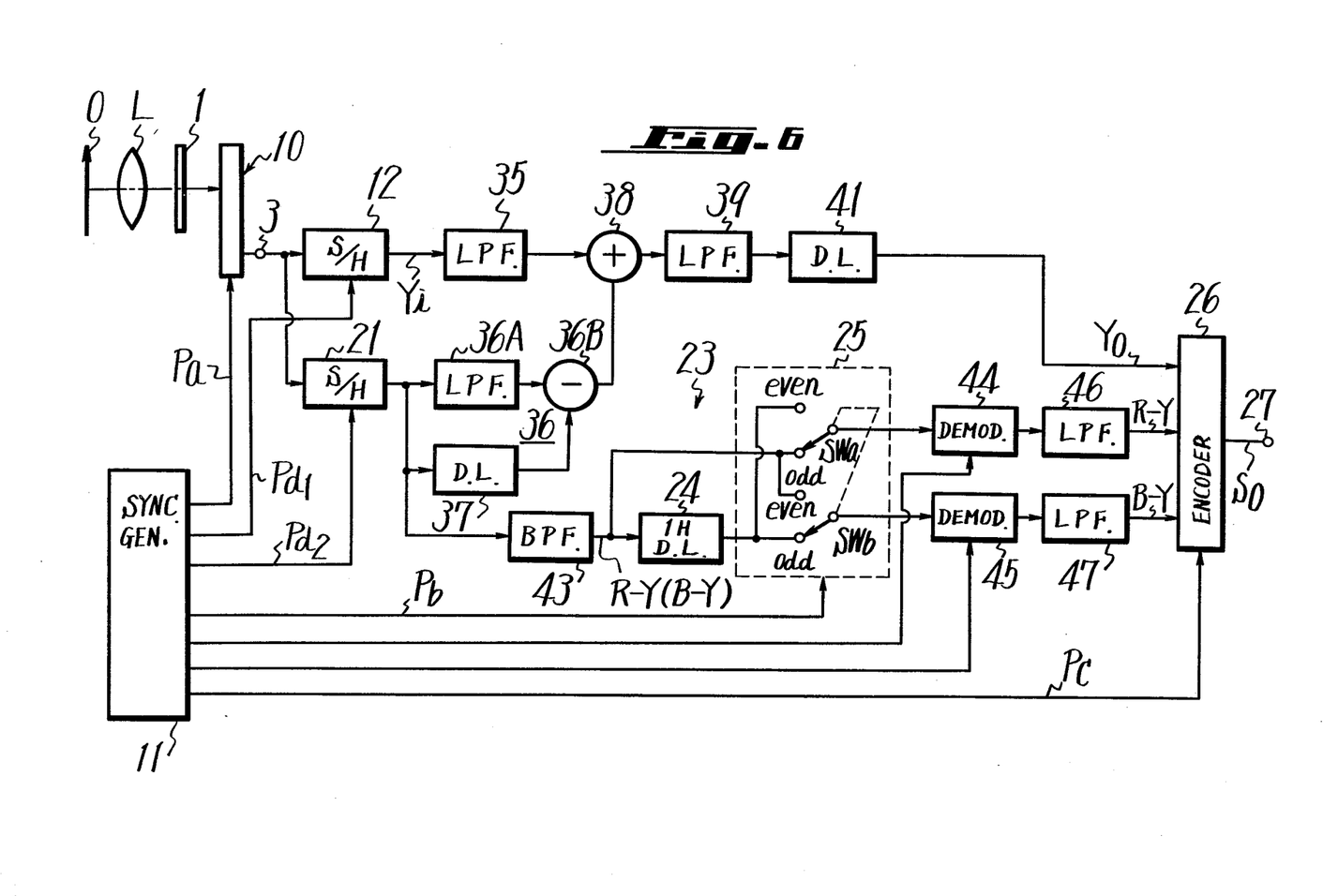
FIG. 6 is a systematic block diagram showing the circuit of an example of the solid state color television camera according to the invention.
Figure 7:
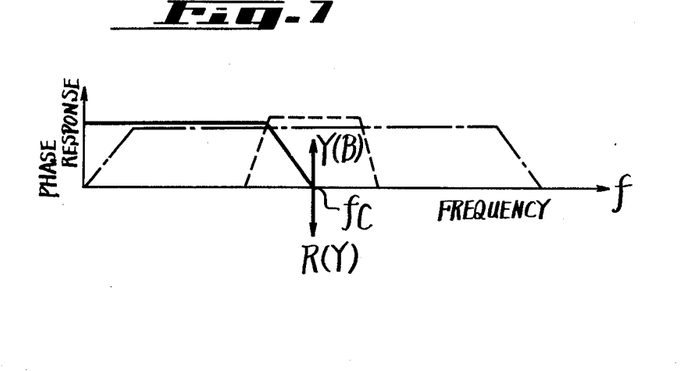
FIGS. 7 and 8A to 8F, inclusive, waveform diagram used for the explanation of the camera of the invention shown in FIG. 6.

The example of the invention shown in FIG. 6 is the case that the color difference signals are extracted from the side band components. In this case, since the color filter 1 shown in FIG. 3 is employed, the relation between the modulating component and side band component becomes as shown in FIG. 7. As to the side band component, at an odd line the luminance signal $Y_i$ and primary color signal R are obtained in opposite phase, and similarly at an even line the luminance signal $Y_i$ and primary color signal B are obtained in opposite phase. Thus, aimed or desired color difference signals R-Y and B-Y can be obtained from the side band components at respective lines in a line sequential manner.

Therefore, in the invention, as shown in FIG. 6, the respective sampled output signals of components Y and R (or B) obtained from sampling hold circuit 21 are fed to band pass filter 43 from which a side band component having a desired band (500 KHz to 1 MHz) with the carrier frequency $f_C$ as the center (shown in FIG. 7 by the dotted line) is derived. In this case, the synchronization of the pulse fed from signal generator 11 to sampling hold circuit 21 is made different from that of FIG. 4 and hence driving pulses $P_{d1}$ and $P_{d2}$ are fed to sampling hold circuits 12 and 21 from generator 11 to sample the luminance signal.

If the side band components from band pass filter 43 are applied to simultaneous circuit 23 to be made simultaneity in time, the color difference signals R-Y and B-Y can be obtained from switching circuit 25 simultaneously. These signals R-Y and B-Y are supplied to demodulators 44 and 45 to be demodulated. The demodulated output signals from demodulators 44 and 45 are fed through low pass filters 46 and 47 to encoder 26. Although the side band components extracted by band pass filter 43 contain the high band component of the modulating component as shown in FIG. 7, the level of this high band component is very low, so that the high band component can be neglected.

Where, if the color difference output signals $E_{CR(N)}$ and $E_{CR(N+1)}$ obtained by the invention are expressed similar to the equations (1) and (2), the following equations (3) and (4) are obtained, respectively.

$$E_{CR(N)} = a\{R_{(N)} - Y_{O(N)}\} + b\{_{(N-1)} - Y_{O(N-1)}\} \quad (3)$$

$$E_{CR(N+1)} = a\{R_{(N)} - Y_{O(N)}\} + b\{B_{(N+1)} - Y_{O(N+1)}\} \quad (4)$$

The color difference signals expressed by the equations (3) and (4) also contain the primary color signals before 1H, but the above primary color signals before 1H contain the luminance signals before 1H. Thus, even in the case that there is no vertical correlation, especially a black-and-white image is picked up, the terms with constants a and b in the equations (3) and (4) become zero, respectively. As a result, there is no fear that a reproduced black-and-white picture is deteriorated by the chrominance signal system or includes color as in the prior art.

The above description is given on the chrominance signal system. That is, when a black-and-white image is picked up, the color difference signals expressed by the above expressions (3) and (4) become zero and hence the deterioration is caused in a reproduced picture.

When the luminance signal system is considered, if the circuit 20 shown in FIG. 4 is used, the side band component remains in the luminance signal system even though the vertical correlation process is achieved in the case that the vertical correlation is not present. When an object to be picked up is a color object, an affect of the remaining side band component on a reproduced picture is not so serious. However, if the object is a black-and-white one, the affect can not be neglected. Therefore, in such a case or upon picking up a black-and-white image it is better to cancel the side band component at every line sequence than to achieve the vertical correlation process as in the case of FIG. 4.

The present invention is to remove the deterioration of a picture caused by the remaining of the side band component in the luminance signal system without using an optical low pass filter of the wavelength dependent type and, upon picking up a black-and-white image, to remove the same defect by always removing the side band component.

Figure 8A:
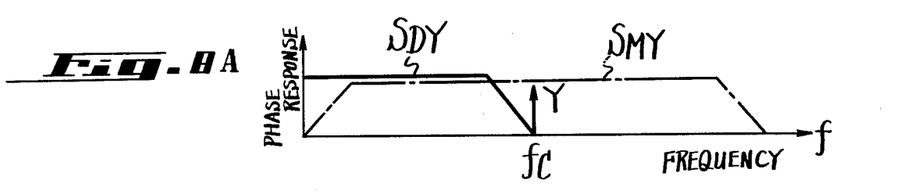
Figure 8B:
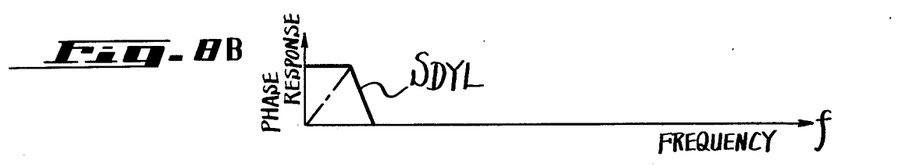

With the example of the invention shown in FIG. 6, the sampling hold circuit 12, which is connected to output terminal 3, is supplied with the sampling signal $P_{d1}$ from generator 11 at every one picture element so as to produce a luminance signal (shown in FIG. 8A). The high band component of the luminance signal used in the present invention is not the luminance signal shown in FIG. 8A but a composite video signal formed of the luminance signal and primary color signal R or B. The reason why the composite video signal is used as the high band component of the luminance signal is that the phases of carriers of the side band components contained in the composite video signal are opposite with respect to the luminance signal and primary color signal. The difference of the carrier phases is used to remove the side band component at every line. Further, since the luminance signal derived from CCD tip 10 is the luminance signal of the NTSC system itself in view of the color separation characteristics of color filter 1, the low band component of the above luminance signal itself is utilized as the low band component of the luminance signal which is used in the invention. Thus, the luminance signal obtained at terminal 3 is fed through sampling hold circuit 12 to a low pass filter 35 to be a low band component $S_{DYL}$ (shown in FIG. 8B) which is restricted to a desired band (500 to 100 KHz) and used, as it is, as a low band component of the luminance signal $Y_O$.

Figure 8C:
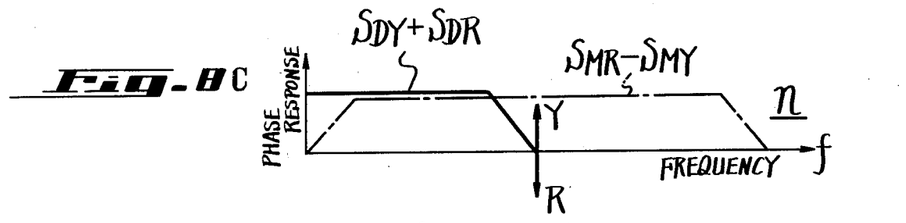
Figure 8D:
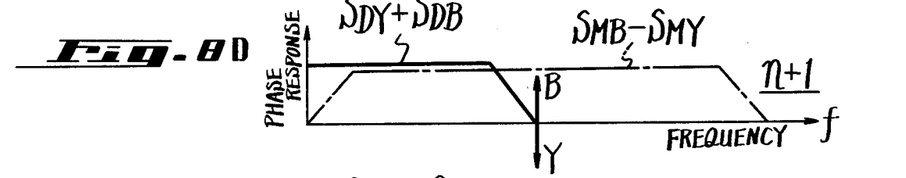

As a high band component of luminance signal $S_o$, the following signal is used from the view point of cancelling the side band components. The sampling hold circuit 21, which is connected to the output terminal 3, is driven by sampling signal $P_{d2}$ supplied thereto from generator 11 at every picture element. As a result, as shown in FIGS. 8C and 8D, composite video signals including primary color signal R or B in addition to the luminance signal are obtained at lines n and n+1 in a line sequence manner in addition to the luminance signal. The composite video signal from sampling hold circuit 21 is fed to a filter circuit 36 consisting of a low pass filter 36A, whose characteristics are selected same as those of low pass filter 35, and a subtractor 36B. From the filter circuit 36 there is obtained a high band component $S_{DYH} + S_{DRH}$ ($S_{DYH} + S_{DBH}$ at n+1 line) shown in FIG. 8E of the composite video signal. This high band component is used as that of the luminance signal in the invention. In FIG. 6, 37 designates a delay circuit or line having the delay amount corresponding to that of low pass filter 36A, which is used for fine adjustment.

Figure 8E:
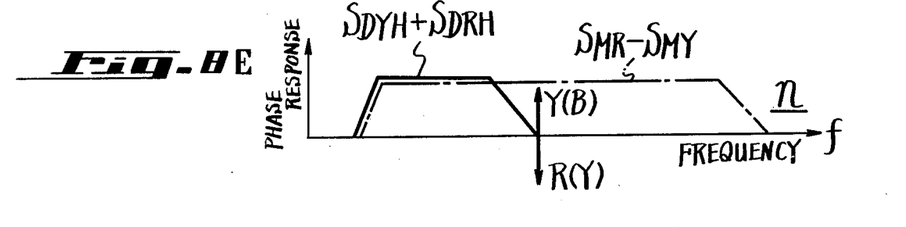
Figure 8F:
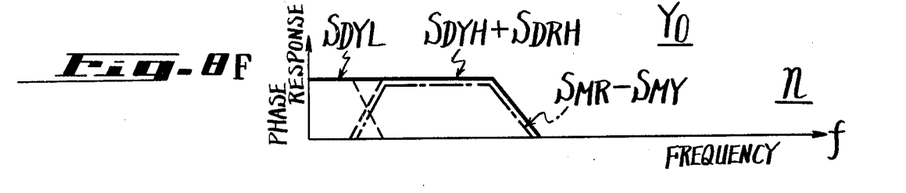

The high band component thus obtained together with the low band component are fed to an adder 38 to be added with each other. When n line is considered, a side band component, whose frequency is higher than carrier frequency $f_C$, is contained in the high band side of the luminance signal as the composite signal, as shown in FIG. 8E. Therefore, the composite signal from adder 38 is fed to a low pass filter 39 whose cut-off frequency is selected about 4.5 MHz. Thus, finally the luminance signal $Y_O$, whose high band component is formed of the picked up output, is obtained as shown in FIG. 8F. A delay circuit or line 41 inserted between low pass filter 39 and encoder 26 is used for fine adjustment in view of the transmission time of the chrominance signal system.

Assuming that when a black-and-white image is picked up the light separation characteristics of color filter 1 is selected such that all the output signals derived from every unit area of color filter 1 are equal or Y=R=B. Since the phase relation between the carrier and side band component of the luminance signal and red color signal at n line is reverse or opposite as shown in FIG. 8C, the respective side band components ($S_{MR}-S_{MY}$) of the luminance signal and red color signal obtained by picking up a black-and-white image are cancelled without carrying out the vertical correlation processes at n and n+1 lines. Similarly, at n+1 line the phases of the luminance signal and red color signal are reverse and hence the side band components ($S_{MB}-S_{MY}$) are cancelled. Therefore, the luminance signal $Y_O$, from which the side band components are removed, can be obtained.

The side band component contained in the low band side (refer to the dotted line in FIG. 8B) is remained even though the above signal process, but the level of the remaining side band component (remaining level) in the low band side is very low with the result that no affect appears.

In case of picking up a color image, the side band component remains in the luminance signal irrespective of whether there is the vertical correlation or not, but no affect is caused on a reproduced picture as described previously. In fact, the color signal component $S_{DRH}$ or $S_{MR}$ is contained in the high band portion of the luminance signal component $Y_O$ shown in FIG. 8F. However, in general the high band component of the luminance signal contributes only to resolution on a television picture screen and only the signal component $S_{DYL}$ is included in the low band side of the luminance signal $Y_O$, so that there occurs no trouble even if the luminance signal $Y_O$ is mixed with the color difference signals in the latter stage.

As described above, according to the present invention the high band component of the picked-up output obtained from the solid state image sensing device 10 is utilized as the high band component of the luminance signal $Y_O$, so that upon picking up a black-and-white image the side band component contained in the high band component can be cancelled. As a result, no influence on a reproduced picture is caused, when a black-and-white image is picked up, by the luminance signal system and hence any deterioration of a picture quality can be avoided.

Further, with the present invention the color difference signals R-Y and B-Y are made in simultaneity and these simultaneous color difference signals and luminance signal are used to produce the desired color video signal, so that any deterioration of a reproduced picture in the chrominance signal system can be avoided irregardless of the vertical correlation without using an optical low pass filter of the wavelength dependent type.

Figure 9:
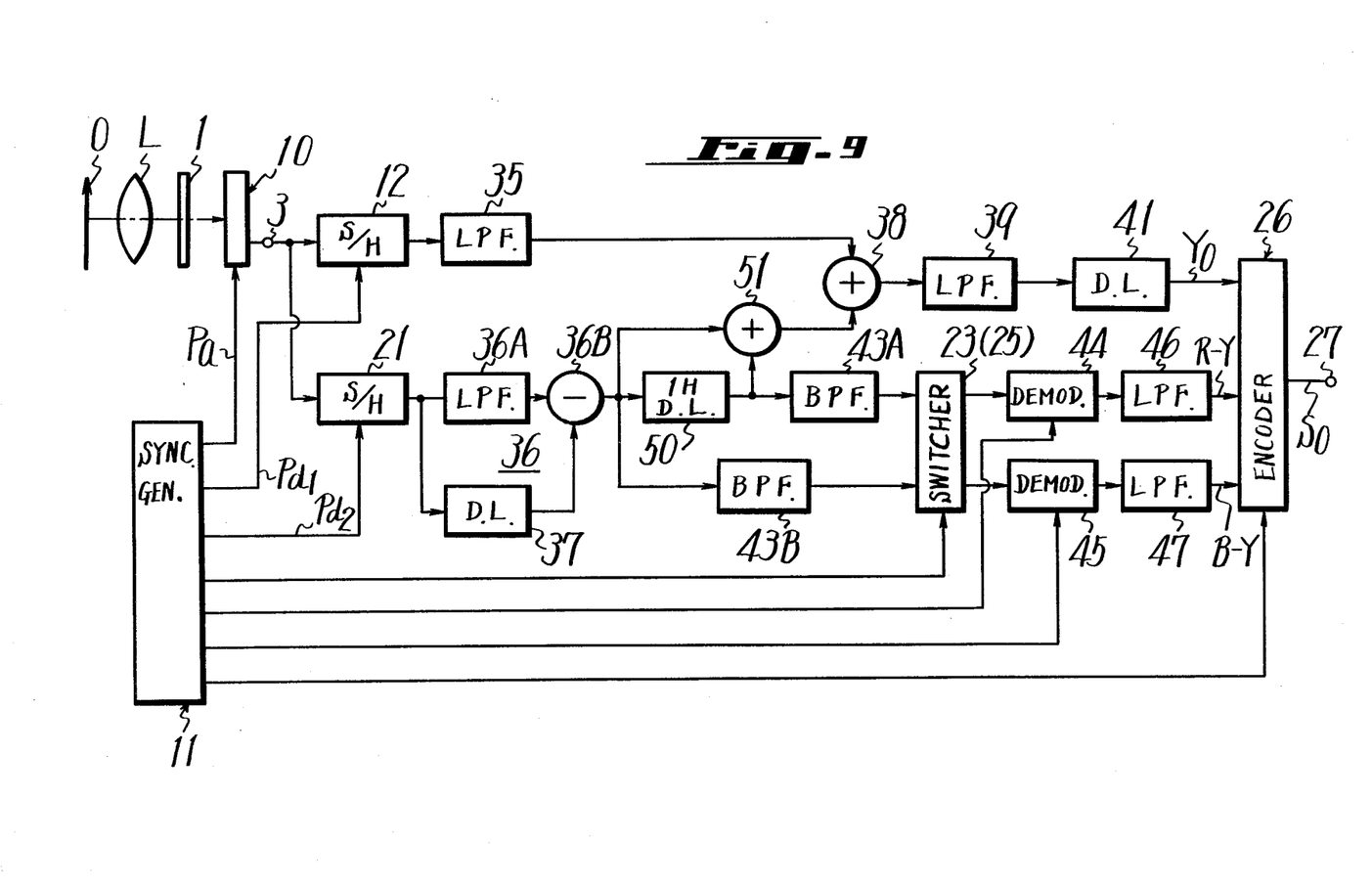
FIG. 9 is a systematic block diagram showing another example of circuit of the invention.

FIG. 9 is a block diagram showing another example of the present invention in which the parts same as those of FIG. 6 are marked with the same reference numerals and their detailed description will be omitted.

The example of the invention shown in FIG. 9 is to remove the side band component in the luminance signal system without failure upon picking up a black-and-white image and also picking up a color image if there exists vertical correlation. To this end, as shown in FIG. 9, a delay circuit or line 50 of 1H is provided at the rear stage of filter circuit 36 and the high band component obtained from filter circuit 36 is fed to delay circuit 50. The output from the filter circuit 36 and the delayed output from delay circuit 50 are applied to an adder 51 in which the output signals from adjacent horizontal periods are added. Since the phases of the luminance signals are reverse, if there exists the vertical correlation, the luminance signals are cancelled and hence only the side band component of the primary color signal remains. In general, this side band component can be neglected as set forth above. Accordingly, the example shown in FIG. 9 can further improve the quality of a reproduced picture.

With the circuit shown in FIG. 9, as the delay circuit 24 used in simultaneous circuit 23 (In FIG. 6), the delay circuit 50 can be used. In this case, two band pass filters 43A and 43B are necessary.

It will be apparent that many modifications and variations could be effected by one skilled in the art without departing from the spirits or scope of the novel concepts of the invention so that the scope of the invention should be determined by the appended claims.

We claim as our invention:

1. A solid state television camera having a solid state image sensing device including a plurality of individual light sensing units arranged in both horizontal and vertical rows, said camera comprising means for establishing an image light path for casting an image on said image sensing means, a filter through which said image light passes before impringing on said image sensing means and having a plurality of color filter elements coincident with said individual light sensing elements being arranged in horizontal rows within said light path with first alternate rows having alternating first segments for passing light of all colors (luminance light) and second segments to pass a first primary color and said first and second segments having different light transmissivity characteristics, second alternating horizontal filter rows having alternating third segments for passing light of a second primary color and fourth segments for passing light of all colors (luminance light), means for processing from carrier signals produced by said plurality of filter elements a low frequency luminance signal component of the luminance signal including a first sample/hold circuit and a first low pass filter, adding means receiving from the output of said first low pass filter said low frequency luminance signal component, means for processing the high frequency luminance signal from said plurality of first and second filter elements and alternately also processing the high frequency luminance signal from said plurality of third and fourth filter elements comprising a second sample/hold circuit, a second low pass filter, a delay line in parallel with said second low pass filter, and a subtractor for receiving the output of said delay line and said second low pass filter and supplying an input to said adder means, the output of said adder producing an entire luminance signal component including the high frequency and low frequency components.

2. A solid state television camera according to claim 1, wherein said camera further comprises means for processing first and second color difference signals filtered from said first and second color signals as desired simultaneous color video signals to be mixed with said entire luminance signal component.

3. A solid state television camera according to claim 2, wherein said filter elements are arranged to pass said first to third luminance signal informations in opposing phase relationship as between successive rows and to pass said first and second primary color informations in opposing phase relationship as between successive rows.

4. A solid state television camera in accordance with claim 1, wherein said first and second colors comprises the colors, red and blue.

5. A solid state television camera in accordance with claim 1, wherein the carrier of said primary color signal and said luminance signal has the same frequency and opposing phase relative to each other as said image light is impinges upon a predetermined horizontal row on said image sensing device.

* * * * *